United States Patent
Heinen et al.

(10) Patent No.: US 10,017,060 B2
(45) Date of Patent: Jul. 10, 2018

(54) SYSTEMS AND METHODS SUPPORTING PERIODIC EXCHANGE OF POWER SUPPLIES IN UNDERWATER VEHICLES OR OTHER DEVICES

(71) Applicant: Raytheon Company, Waltham, MA (US)

(72) Inventors: Gregory W. Heinen, Lowell, MA (US); Marcos M. Sastre Cördova, Warren, RI (US)

(73) Assignee: Raytheon Company, Waltham, MA (US)

( * ) Notice: Subject to any disclaimer, the term of this patent is extended or adjusted under 35 U.S.C. 154(b) by 135 days.

(21) Appl. No.: 15/264,399

(22) Filed: Sep. 13, 2016

(65) Prior Publication Data

US 2018/0072168 A1    Mar. 15, 2018

(51) Int. Cl.
*B63G 8/00* (2006.01)
*B60L 11/18* (2006.01)
*H02J 7/00* (2006.01)

(52) U.S. Cl.
CPC .......... *B60L 11/1816* (2013.01); *B63G 8/001* (2013.01); *H02J 7/0013* (2013.01);
(Continued)

(58) Field of Classification Search
CPC .............. B63G 8/001; B63G 2008/002; B63B 2211/00; B63B 2211/02; B63B 2211/04;
(Continued)

(56) References Cited

U.S. PATENT DOCUMENTS 952,452 A    3/1910    Leon
1,108,109 A    8/1914    LaGergren
(Continued)

FOREIGN PATENT DOCUMENTS

DE    215277 C    12/1906
EP    2660433 A1    11/2013
(Continued)

OTHER PUBLICATIONS

International Search Report and Written Opinion of the International Searching Authority for International Patent Application No. PCT/US2017/017499 dated May 29, 2017, 13 pages.
(Continued)

*Primary Examiner* — Daniel V Venne

(57) ABSTRACT

An apparatus includes a shell having multiple ducts that define multiple flow passages through the shell. The apparatus also includes a core disposed within the shell and including one or more rechargeable power supplies. The apparatus further includes multiple drivers configured to cause water to flow through the ducts in order to maneuver the apparatus toward a host device. In addition, the apparatus includes at least one interface on the shell, where the at least one interface is configured to receive power from the one or more rechargeable power supplies and provide the power to the host device. The apparatus may be configured to dock with the host device and to be transported by and supply the power to the host device as the host device travels through a body of water.

21 Claims, 12 Drawing Sheets

(52) U.S. Cl.
CPC ....... *B60L 2200/32* (2013.01); *B63B 2211/02* (2013.01); *B63G 2008/002* (2013.01)

(58) Field of Classification Search
CPC ............. B63B 2209/00; B60L 11/1816; B60L 2200/32; H02J 7/0013
USPC ................................ 114/312, 313; 440/1, 6
See application file for complete search history.

(56) References Cited

U.S. PATENT DOCUMENTS

| | | |
|---|---|---|
| 1,315,267 A | 9/1919 | White |
| 1,361,561 A | 12/1920 | Yancey |
| 1,421,369 A | 7/1922 | Ardo |
| 1,710,670 A | 4/1929 | Bonney |
| 2,000,746 A | 5/1935 | Dray |
| 2,381,478 A | 8/1945 | Zukor |
| 2,537,929 A | 1/1951 | Daly et al. |
| 2,642,693 A | 6/1953 | Broady |
| 2,720,367 A | 10/1955 | Doolittle |
| 2,750,794 A | 6/1956 | Downs |
| 2,783,955 A | 3/1957 | Fitz Patrick |
| 2,823,636 A | 2/1958 | Gongwer |
| 2,826,001 A | 3/1958 | Presnell |
| 2,845,221 A | 7/1958 | Vine et al. |
| 2,964,874 A | 12/1960 | Armando |
| 3,157,145 A | 11/1964 | Farris et al. |
| 3,698,345 A | 10/1972 | Kreitner |
| 3,818,523 A | 6/1974 | Stillman |
| 4,445,818 A | 5/1984 | Ohsaki et al. |
| 4,577,583 A | 3/1986 | Green, II |
| 4,850,551 A | 7/1989 | Krawetz et al. |
| 4,919,637 A | 4/1990 | Fleischmann |
| 5,134,955 A | 8/1992 | Manfield |
| 5,291,847 A | 3/1994 | Webb |
| 5,303,552 A | 4/1994 | Webb |
| 5,615,632 A | 4/1997 | Nedderman, Jr. |
| 6,142,092 A | 11/2000 | Coupland |
| 6,263,819 B1 | 7/2001 | Gorustein et al. |
| 6,328,622 B1 | 12/2001 | Geery |
| 6,807,921 B2* | 10/2004 | Huntsman ................ B63G 8/08 114/312 |
| 7,077,072 B2* | 7/2006 | Wingett .................. B63B 22/18 114/312 |
| 7,410,395 B2* | 8/2008 | Kawai ..................... B63B 35/40 114/248 |
| 8,069,808 B1 | 12/2011 | Imlach et al. |
| 8,109,223 B2* | 2/2012 | Jamieson ............... B63G 8/001 114/312 |
| 8,205,570 B1 | 6/2012 | Tureaud et al. |
| 2003/0167998 A1* | 9/2003 | Huntsman ................ B63G 8/08 114/312 |
| 2005/0149236 A1* | 7/2005 | Potter .................. G05D 1/0022 701/21 |
| 2005/0279270 A1* | 12/2005 | Wingett ................. B63G 8/001 114/312 |
| 2007/0186553 A1 | 8/2007 | Lin |
| 2008/0088171 A1 | 4/2008 | Cheng |
| 2009/0178603 A1 | 7/2009 | Imlach et al. |
| 2010/0327605 A1 | 12/2010 | Andrews |
| 2011/0101579 A1 | 5/2011 | Polakowski et al. |
| 2012/0091942 A1 | 4/2012 | Jones et al. |
| 2012/0289103 A1 | 11/2012 | Hudson et al. |

FOREIGN PATENT DOCUMENTS

| | | |
|---|---|---|
| EP | 2698506 A1 | 2/2014 |
| GB | 235363 A | 6/1925 |
| GB | 541775 A | 12/1941 |
| GB | 658070 A | 10/1951 |
| GB | 2422877 A | 8/2006 |
| WO | 2011000062 A1 | 1/2011 |

OTHER PUBLICATIONS

International Search Report and Written Opinion of the International Search Authority for PCT Patent Application No. PCT/US2017/016976 dated Feb. 12, 2018, 18 pages.
Jack A. Jones et al., "Novel Thermal Powered Technology for UUV Persistant Surveillance", California Institute of Technology, Feb. 10, 2006, 11 pages.
Terry Huntsberger et al., "Slocum-TREC Thermal Glider", California Institute of Technology, Jan. 31, 2012, 16 pages.
Terry Huntsberger et al., "Advanced Energy Storage System for Thermal Engines", California Institute of Technology, Jan. 31, 2013, 16 pages.
Yi Chao, "Diurnal Variability Part I: Global 1-km SST (G1SST) Part II:GHRSST-DV-Argo Obs. System", California Institute of Technology, Feb. 28, 2011, 19 pages.
NASA,"Utilizing Ocean Thermal Energy in a Submarine Robot", NASA's Jet Propulsion Laboratory, NASA Tech Briefs NPO-43304, Dec. 18, 2008, 4 pages.
T. Shimura et al., "Long-Range Time Reversal Communication in Deep Water: Experimental Results", J. Acoust. Soc. Am. 132 (1), Jul. 2012, [http://dx.doi.org/10.1121/1.4730038], Jun. 19, 2012, 5 pages.
Mosca, et al.; "Low-Frequency Acoustic Source for AUV Long-Range Communication"; iXSea, France; JAMSTEC, Japan, Jul. 2013, 9 pages.
Gregory W. Heinen, "Modified CO2 Cycle for Long Endurance Unmanned Underwater Vehicles and Resultant Chirp Acoustic Capability", U.S. Appl. No. 15/091,415, filed Apr. 5, 2016.
Gregory W. Heinen, et al., "Apparatus and Method for Periodically Charging Ocean Vessel or Other System Using Thermal Energy Conversion", U.S. Appl. No. 15/173,178, filed Jun. 3, 2016.
Gregory W. Heinen, "Hydraulic Drives for Use in Charging Systems, Ballast Systems, or Other Systems of Underwater Vehicles," U.S. Appl. No. 15/173,214, filed Jun. 3, 2016.
Bowen, M.F., "A Passive Capture Latch for ODYSSEY-Class AUVs," Technical Report WHOI-98-12, Jun. 12, 1998, 91 pages, publisher Woods Hole Oceanographic Institution, Woods Hole, MA.
Singh, Hanumant, et al., "Docketing for an Autonomous Ocean Sampling Network," IEEE Journal of Oceanic Engineering, Oct. 2001, pp. 498-514, vol. 26, No. 4, publisher IEEE, Piscataway, New Jersey.
Bowen, Andrew D., et al., "The Nereus Hybrid Underwater Robotic Vehicle for Global Ocean Science Operations to 11,000m Depth," 2008, 10 pages, publisher IEEE, Piscataway, New Jersey.
Hardy, Tim, et al., "Unmanned Underwater Vehicle (UUV) deployment and retrieval considerations for submarines," Paper on UUV Development and Retrieval Options for Submarines, Apr. 2008, pp. 1-15, publisher BMT Defense Services Ltd., Bath, United Kingdom.
Cowen, Steve, "Flying Plug: A Small UUV Designed for Submarine Data Connectivity (U)," Abstract, 1997, 21 pages, publisher PN.
Gish, Lynn Andrew, "Design of an AUV Recharging System," 2004, 134 pages, publisher Massachusetts institute of Technology, Cambridge, Massachusetts.
Vandenberg, Troy D., "Manning and Maintainability of a Submarine Unmanned Undersea Vehicle (UUV) Program: A Systems Engineering Case Study," Thesis, Sep. 2010, 137 pages, publisher Naval Postgraduate School, Monterey, California.
Griffiths, Gwyn, "Technology and Applications of Autonomous Underwater Vehicles," 2003, pp. 93-108, publisher Taylor & Franscis, New York, NY.
Galletti Di Cadilhac, Robin, "Docketing System," 2003, pp. 93-108, publisher Taylor & Franscis, New York, NY.
Singh, Hanumant, et al., "AOSN MURI: Docketing for an Autonomous Ocean Sampling Network," Program #: ONR-322 OM/AOSN N00014-95-1-13166, 1998, 6 pages, available at http://www.whoi.edu/DSL/hanu/.
Foreign Communication from Related Counterpart Application, PCT Application No. PCT/US2016/062518, International Seach Report and the Written Opinion of the International Searching Authority dated May 18, 2017, 12 pages.

* cited by examiner

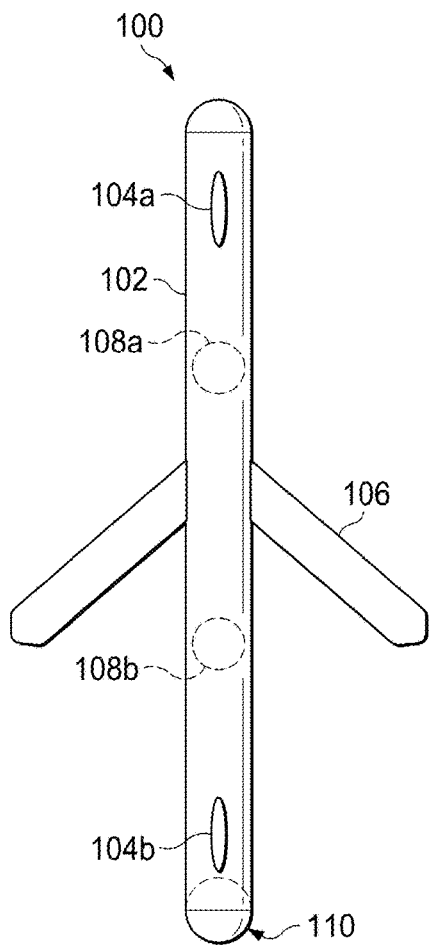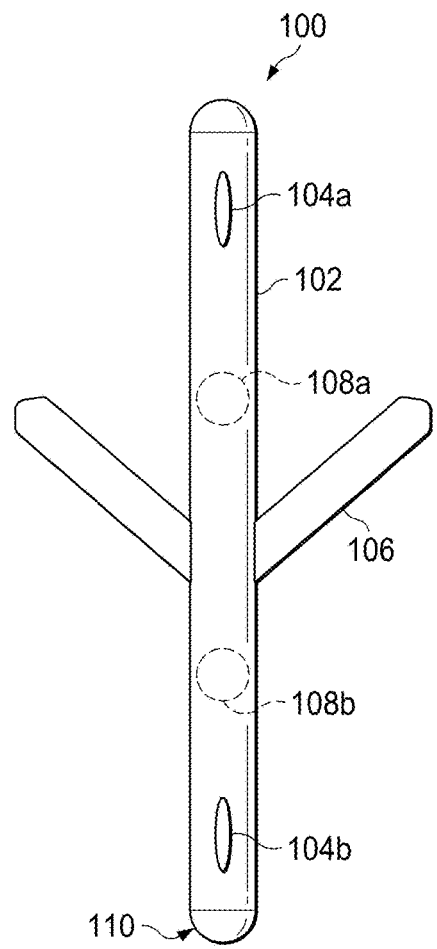
FIG. 1A  FIG. 1B
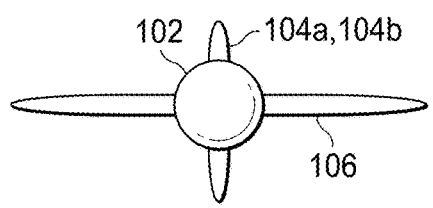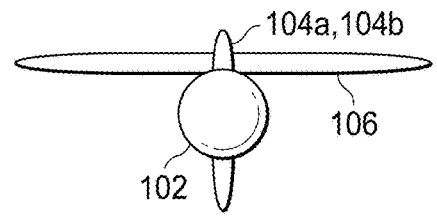
FIG. 1C  FIG. 1D

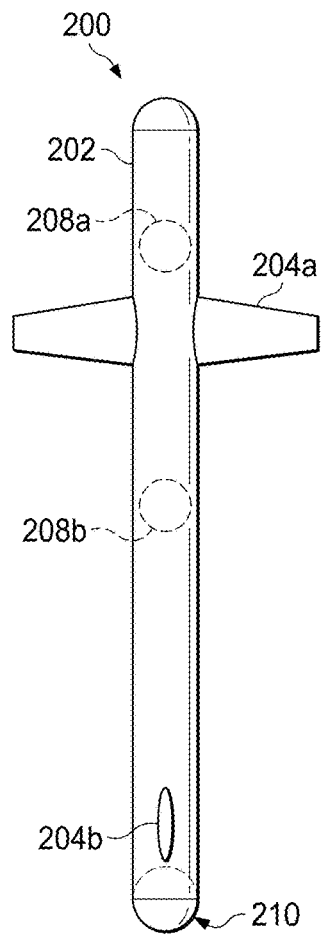 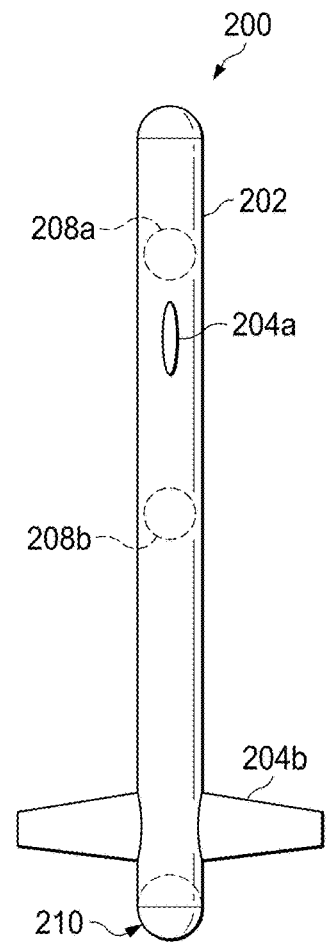
FIG. 2A          FIG. 2B
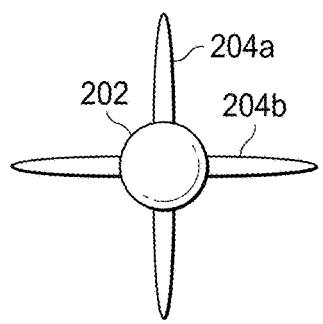
FIG. 2C

SYSTEMS AND METHODS SUPPORTING PERIODIC EXCHANGE OF POWER SUPPLIES IN UNDERWATER VEHICLES OR OTHER DEVICES

TECHNICAL FIELD

This disclosure generally relates to underwater vehicles. More specifically, this disclosure relates to systems and methods supporting the periodic exchange of power supplies in underwater vehicles or other devices.

BACKGROUND

Unmanned underwater vehicles (UUVs) can be used in a number of applications, such as undersea surveying, recovery, or surveillance operations. However, supplying adequate power to UUVs for prolonged operation can be problematic. For example, one prior approach simply tethers a UUV to a central power plant and supplies power to the UUV through the tether. However, this clearly limits the UUV's range and deployment, and it can prevent the UUV from being used in situations requiring independent or autonomous operation. Other prior approaches require a UUV to maneuver into a suitable position to dock with a socket, nose cone, single-sealed contact, flying plug socket, docking cradle, or torpedo launch and recovery system. However, this can cause problems when the UUV is difficult to maneuver or is easily subject to damage through contact with external objects.

SUMMARY

This disclosure provides systems and methods supporting the periodic exchange of power supplies in underwater vehicles or other devices.

In a first embodiment, an apparatus includes a shell having multiple ducts that define multiple flow passages through the shell. The apparatus also includes a core disposed within the shell and including one or more rechargeable power supplies. The apparatus further includes multiple drivers configured to cause water to flow through the ducts in order to maneuver the apparatus toward a host device. In addition, the apparatus includes at least one interface on the shell, where the at least one interface is configured to receive power from the one or more rechargeable power supplies and provide the power to the host device.

In a second embodiment, a method includes storing power in one or more rechargeable power supplies of a power carrier, where the power carrier includes (i) a shell having multiple ducts that define multiple flow passages through the shell and (ii) a core disposed within the shell and having the one or more rechargeable power supplies. The method also includes maneuvering the power carrier toward a host device using multiple drivers that cause water to flow through the ducts. The method further includes transferring power from the one or more rechargeable power supplies to the host device using at least one interface on the shell of the power carrier.

In a third embodiment, a system includes a host device and a power carrier. The power carrier includes a shell having multiple ducts that define multiple flow passages through the shell. The power carrier also includes a core disposed within the shell and comprising one or more rechargeable power supplies. The power carrier further includes multiple drivers configured to cause water to flow through the ducts in order to maneuver the power carrier toward the host device. In addition, the power carrier includes at least one interface on the shell, where the at least one interface is configured to receive power from the one or more rechargeable power supplies and provide the power to the host device.

In a fourth embodiment, a system includes an underwater vehicle and a power carrier. The underwater vehicle includes a power generator. The power carrier includes a shell having multiple ducts that define multiple flow passages through the shell. The power carrier also includes a core disposed within the shell and comprising one or more rechargeable power supplies. The power carrier further includes multiple drivers configured to cause water to flow through the ducts in order to maneuver the power carrier toward the underwater vehicle. In addition, the power carrier includes at least one interface on the shell, where the at least one interface is configured to receive the power from the underwater vehicle and provide the power for storage in the one or more rechargeable power supplies.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which:

FIGS. 1A through 1D illustrate a first example underwater vehicle for use with a power carrier in accordance with this disclosure;

FIGS. 2A through 2C illustrate a second example underwater vehicle for use with a power carrier in accordance with this disclosure;

DETAILED DESCRIPTION

Figure 3:
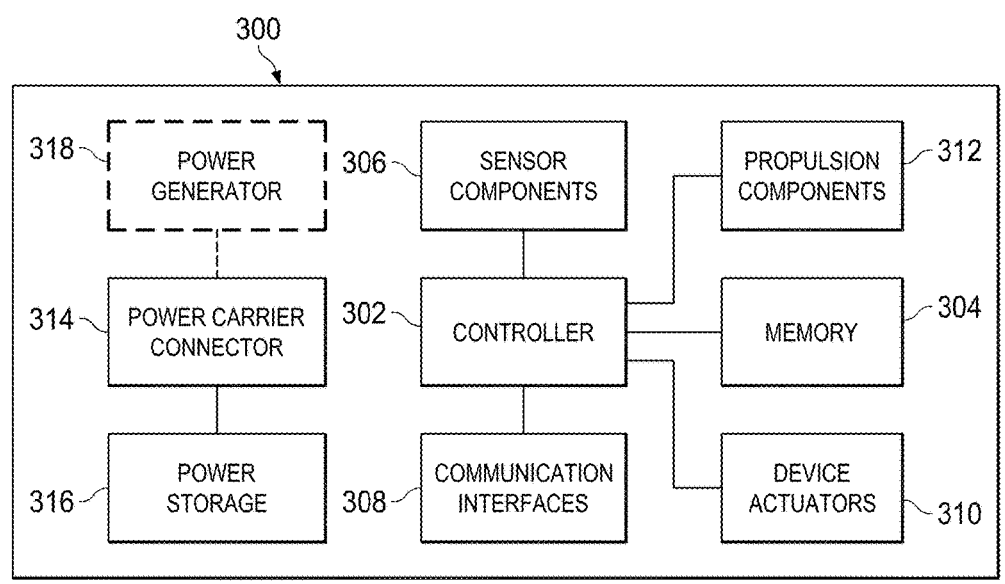
FIG. 3 illustrates example components of an underwater vehicle for use with a power carrier in accordance with this disclosure.

FIGS. 1 through 13, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

FIGS. 1A through 1D illustrate a first example underwater vehicle 100 for use with a power carrier in accordance with this disclosure. In this example, the vehicle 100 denotes an unmanned underwater vehicle or other device that can function as both a buoy and a glider within an ocean or other body of water. The vehicle 100 could be used to support various functions, such as undersea surveying, recovery, or surveillance operations.

As shown in FIGS. 1A and 1B, the vehicle 100 includes a body 102 having fins 104a-104b and wings 106. The body 102 denotes any suitable structure configured to encase, protect, or otherwise contain other components of the vehicle 100. The body 102 could be formed from any suitable material(s) and in any suitable manner. The body 102 can be formed so that the vehicle 100 is able to withstand extremely elevated pressures found at deep depths in an ocean or other body of water. In some embodiments, the body 102 could allow the vehicle 100 to operate at depths of up to 1,000 meters or more.

The fins 104a-104b denote projections from the body 102 that help to stabilize the body 102 during travel. Each of the fins 104a-104b could be formed from any suitable material(s) and in any suitable manner. Also, each of the fins 104a-104b could have any suitable size, shape, and dimensions. Further, at least some of the fins 104a-104b could be movable or adjustable to help alter the course of the body 102 and to steer the body 102 through water during travel. In addition, the numbers and positions of the fins 104a-104b shown here are examples only, and any numbers and positions of fins could be used to support desired operations of the vehicle 100.

During operation, the underwater vehicle 100 can ascend and descend within a body of water, such as when the vehicle 100 ascends to identify its location and descends to perform surveying, recovery, surveillance, or other operations. In some embodiments, the fins 104a could be used to steer the vehicle 100 while ascending, and the fins 104b could be used to steer the vehicle 100 while descending. Moreover, when the vehicle 100 is ascending, the fins 104a can be used to control the pitch of the vehicle 100, and a differential between the fins 104a can be used to control the roll of the vehicle 100. Similarly, when the vehicle 100 is descending, the fins 104b can be used to control the pitch of the vehicle 100, and a differential between the fins 104b can be used to control the roll of the vehicle 100.

The wings 106 support gliding movement of the vehicle 100 underwater. The wings 106 are moveable to support different directions of travel. For example, the wings 106 are swept downward in FIG. 1A when the vehicle 100 is ascending, and the wings 106 are swept upward in FIG. 1B when the vehicle 100 is descending. In this way, the wings 106 help to facilitate easier or more rapid movement of the vehicle 100 while ascending or descending. Each of the wings 106 could be formed from any suitable material(s) and in any suitable manner. Also, each of the wings 106 could have any suitable size, shape, and dimensions. In addition, the number and positions of the wings 106 shown here are examples only, and any number and positions of wings could be used to support desired operations of the vehicle 100.

The underwater vehicle 100 could further include one or more ballasts 108a-108b, which help to control the center of gravity of the vehicle 100. Underwater gliders can be particularly susceptible to changes in their centers of gravity, so the vehicle 100 can adjust one or more of the ballasts 108a-108b as needed or desired (such as during ascent or descent) to maintain the center of gravity of the vehicle 100 substantially at a desired location. Each ballast 108a-108b includes any suitable structure configured to modify the center of gravity of an underwater vehicle. Note that the number and positions of the ballasts 108a-108b shown here are examples only, and any number and positions of ballasts could be used in the vehicle 100.

FIGS. 1C and 1D illustrate different possible end views of the underwater vehicle 100. In FIG. 1C, the wings 106 are positioned and extend from the body 102 along a line through a center of the body 102. In FIG. 1D, the wings 106 are positioned and extend from the body 102 along a line tangential to the body 102. In either case, the wings 106 can be stowed in a folded position where the wings 106 extend along the length of the body 102 and later unfolded before, during, or after deployment.

The underwater vehicle 100 in this example can be coupled to at least one removable power carrier 110. As described in more detail below, the power carrier 110 denotes a device that is maneuverable under water and that can be used to carry or store power. Multiple power carriers 110 could be usable with the underwater vehicle 100 so that, for example, the underwater vehicle 100 stops using a first power carrier 110 and begins using a second power carrier 110 when a power level of the first power carrier 110 drops below a threshold level. As a particular example, the underwater vehicle 100 could travel long distances and, at specified intervals or when required, replace a depleted power carrier 110 with a charged power carrier 110.

The power carrier 110 includes one or more propulsion mechanisms, such as motors or thrusters, which allow the power carrier 110 to maneuver under water. As a result, each power carrier 110 can maneuver towards or away from the underwater vehicle 100 or can maneuver to be at or near a desired location. As a particular example, one power carrier 110 could maneuver away from the underwater vehicle 100 and another power carrier 110 could maneuver toward the underwater vehicle 100 during a power carrier replacement.

Each power carrier 110 includes any suitable structure for carrying power for an underwater vehicle and for maneuvering under water. Each power carrier 110 could have any suitable size, shape, and dimensions. While the power carrier 110 is shown here as being generally spherical, other forms of the power carrier 110 could be used.

FIGS. 2A through 2C illustrate a second example underwater vehicle 200 for use with a power carrier in accordance with this disclosure. In this example, the vehicle 200 denotes an unmanned underwater vehicle or other device that can function as a buoy within an ocean or other body of water. The vehicle 200 could be used to support various functions, such as undersea surveying, recovery, or surveillance operations.

As shown in FIGS. 2A through 2C, the underwater vehicle 200 includes a body 202 and fins 204a-204b. The body 202 denotes any suitable structure configured to encase, protect, or otherwise contain other components of the vehicle 200. The body 202 could be formed from any suitable material(s) and in any suitable manner. The fins 204a-204b denote projections from the body 202 that help to stabilize the body 202 during travel. Each of the fins 204a-204b could be formed from any suitable material(s) and in any suitable manner. Also, each of the fins 204a-204b could have any suitable size, shape, and dimensions. Further, at least some of the fins 204a-204b could be movable or adjustable to help alter the course of the body 202 and to steer the body 102 through water during travel. In addition, the numbers and positions of the fins 204a-204b shown here are examples only, and any numbers and positions of fins could be used to support desired operations of the vehicle 200. The vehicle 200 may further include one or more ballasts 208a-208b, which help to control the center of gravity of the vehicle 200.

As can be seen in FIGS. 2A through 2C, the underwater vehicle 200 lacks wings used to support gliding of the vehicle 200 through water. As a result, the vehicle 200 denotes a device that can function as a buoy but generally not as a glider within an ocean or other body of water.

The underwater vehicle 200 in this example can be coupled to at least one removable power carrier 210. As described in more detail below, the power carrier 210 denotes a device that is maneuverable under water and that can be used to carry or store power. Multiple power carriers 210 could be usable with the underwater vehicle 200 so that, for example, the underwater vehicle 200 stops using a first power carrier 210 and begins using a second power carrier 210 when a power level of the first power carrier 210 drops below a threshold level. The power carrier 210 includes one or more propulsion mechanisms, such as motors or thrusters, which allow the power carrier 210 to maneuver under water. Each power carrier 210 includes any suitable structure for carrying power for an underwater vehicle and for maneuvering under water. Each power carrier 210 could have any suitable size, shape, and dimensions.

In some embodiments, each of the power carriers 110, 210 could have a generally spherical shape. A shape in the form of a sphere may be beneficial for various reasons. For example, a power carrier 110, 210 may operate in an environment where it is desired to expend very little energy to maintain a neutral buoyancy or "floating" condition, thereby saving the bulk of the stored energy in the power carrier 110, 210 for maneuvering and transfer to an underwater vehicle 100, 200. Also, since a spherical shape can be very effective in withstanding compressive (subsurface) forces, this shape is naturally conducive to deep dive compressive forces. Further, a spherical shape is generally neutral to roll, pitch, and yawing moments relative to other non-spherical shapes for currents or flows. In addition, a spherical shape is generally well-suited in providing a universal docking fit for various devices. In particular embodiments, the underwater vehicles 100 and 200 could be about twenty feet long and about one foot in diameter, and the power carriers 110, 210 could be spherical with a diameter of about one foot. Note, however, that the power carriers 110, 210 could have any suitable non-spherical shapes, such as cylindrical.

In some embodiments, each underwater vehicle 100 or 200 shown in FIGS. 1A through 2C could remain generally vertical during normal operation. In this configuration, the vehicle 100 or 200 is generally operating as a buoy and can collect information or perform other tasks. Of course, exact vertical orientation is not required during operation of the vehicle 100 or 200. During movement up and down within a body of water, the vehicle 100 or 200 can travel through the water to the surface or to a desired depth of the water. While submerged, the vehicle 100 or 200 could perform operations such as capturing various sensor measurements or searching for anomalies. Periodic surfacing of the vehicle 100 or 200 may allow the vehicle 100 or 200 to, among other things, transmit and receive data and verify its current location (note that the term "periodic" and its derivatives do not require action at a specific interval but merely that an action occurs repeatedly, possibly although not necessarily at a specific interval). After each surfacing, the vehicle 100 or 200 can re-submerge and, if needed, travel at an angle to a desired depth. The angle of travel may be based on the current location of the vehicle 100 or 200 and its desired location, which may allow the vehicle 100 or 200 to operate continuously or near-continuously at a desired station.

The power carriers 110 and 210 described above could dock with the underwater vehicles 100 and 200 in any suitable manner and could be transported by the underwater vehicles 100 and 200 over any suitable distances. Also, the power carriers 110 and 210 described above could be used in any suitable manner. For example, in some embodiments, a naval vessel, aircraft, or other delivery vehicle could be used to deliver or drop charged power carriers 110 and 210 into a desired geographic area. The power carriers 110 and 210, once used and undocked from the underwater vehicles, could then be recovered and recharged by naval vessels or other devices.

In some embodiments, various underwater vehicles 100 and 200 could operate to charge the power carriers 110 and 210, while other underwater vehicles 100 and 200 operate using power from the charged power carriers 110 and 210. In these embodiments, the "charging" underwater vehicles 100 and 200 can include power generation capabilities and mechanisms for transferring generated power into the power carriers 110 and 210 for storage. Any suitable power generation capabilities could be used in charging underwater vehicles to charge power carriers. For instance, underwater vehicles could use the flow of a liquid and/or vapor refrigerant to generate electrical power, where flows of the refrigerant are creating using pressure and/or temperature differences in tanks holding the refrigerant. Specific examples of underwater vehicles with these types of power generation systems are described in U.S. patent application Ser. No. 15/091,415 filed on Apr. 5, 2016; U.S. patent application Ser. No. 15/173,178 filed on Jun. 3, 2016; and U.S. patent application Ser. No. 15/173,214 filed on Jun. 3, 2016 (all of which are hereby incorporated by reference in their entirety).

Although FIGS. 1A through 2C illustrate examples of underwater vehicles 100 and 200 for use with power carriers, various changes may be made to FIGS. 1A through 2C. For example, these figures illustrate example underwater vehicles only, and the power carriers described in this patent document could be used in any other suitable device or system.

FIG. 3 illustrates example components of an underwater vehicle 300 for use with a power carrier in accordance with this disclosure. The underwater vehicle 300 could, for example, denote either of the underwater vehicles 100 and 200 described above. The components shown in FIG. 3 could therefore denote internal or other components of either of the vehicles 100 and 200.

As shown in FIG. 3, the vehicle 300 includes at least one controller 302 and at least one memory 304. The controller 302 controls the overall operation of the vehicle 300, such as by controlling how the vehicle 300 moves or by controlling communications to and from the vehicle 300. The controller 302 can denote any suitable hardware or combination of hardware and software/firmware for controlling the vehicle 300. For example, the controller 302 could denote at least one processor configured to execute instructions obtained from the memory 304. The controller 302 may include any suitable number(s) and type(s) of processors or other computing or control devices in any suitable arrangement. Example types of controllers 302 include microprocessors, microcontrollers, digital signal processors, field programmable gate arrays, application specific integrated circuits, and discrete circuitry.

The memory 304 stores data used, generated, or collected by the controller 302 or other components of the vehicle 300. Each memory 304 represents any suitable structure(s) configured to store and facilitate retrieval of information (such as data, program code, and/or other suitable information on a temporary or permanent basis). Some examples of the memory 304 can include at least one random access memory, read only memory, Flash memory, or any other suitable volatile or non-volatile storage and retrieval device(s).

The vehicle 300 in this example also includes one or more sensor components 306, one or more communication interfaces 308, and one or more device actuators 310. The sensor components 306 include sensors that could be used to sense any suitable characteristics of the vehicle 300 itself or the environment around the vehicle 300. For example, the sensor components 306 could include a proximity sensor or other sensors for detecting power carriers (such as the power carriers 110 or 210). The sensor components 306 could also include a position sensor, such as a Global Positioning System (GPS) sensor, which can identify the position of the vehicle 300. This could be used, for instance, to help make sure that the vehicle 300 is following a desired path or is maintaining its position at or near a desired location. The sensor components 306 could further include audio sensors for capturing audio signals, photodetectors or other cameras for capturing video signals or photographs, or any other or additional components for capturing any other or additional information. Each sensor component 306 includes any suitable structure for sensing one or more characteristics.

The communication interfaces 308 support interactions between the vehicle 300 and other devices or systems. For example, the communication interfaces 308 could include at least one radio frequency (RF) or other transceiver configured to communicate with one or more satellites, airplanes, ships, or other nearby or distant devices. The communication interfaces 308 allow the vehicle 300 to transmit data to one or more external destinations, such as information associated with data collected by the sensor components 306. The communication interfaces 308 also allow the vehicle 300 to receive data from one or more external sources, such as instructions for other or additional operations to be performed by the vehicle 300 or instructions for controlling where the vehicle 300 operates. Each communication interface 308 includes any suitable structure(s) supporting communication with the vehicle 300.

The device actuators 310 are used to adjust one or more operational aspects of the vehicle 300. For example, the device actuators 310 could be used to move the fins 104a-104b, 204a-204b of the vehicle while the vehicle is ascending or descending. The device actuators 310 could also be used to control the positioning of the wings 106 to control whether the wings 106 are stowed or swept upward or downward (depending on the direction of travel). Each device actuator 310 includes any suitable structure for physically modifying one or more components of an underwater vehicle.

The vehicle 300 further includes one or more propulsion components 312, which denote components used to physically move the vehicle 300 through water. The propulsion components 312 could denote one or more motors or other propulsion systems. In some embodiments, the propulsion components 312 could be used only when the vehicle 300 is traveling between a position at or near the surface and a desired depth. During other time periods, the propulsion components 312 could be deactivated. Of course, other embodiments could allow the propulsion components 312 to be used at other times, such as to help maintain the vehicle 300 at a desired location or to help move the propulsion components 312 to avoid observation or detection.

In addition, the vehicle 300 includes at least one power carrier connector 314 and at least one power storage 316. The vehicle 300 may optionally include at least one power generator 318 if the vehicle 300 is used to charge power carriers (such as the power carriers 110 or 210). The power carrier connector 314 generally allows the vehicle 300 to be coupled to at least one power carrier in order to receive power from or charge the at least one power carrier. For example, in some embodiments, the power carrier connector 314 allows power to be received from a power carrier 110 or 210, and the received power can be conditioned (if needed) and stored in the power storage 316 or provided to other components of the vehicle 300. In other embodiments, the power generator 318 generates power and provides at least some of the generated power to the power carrier connector 314 for storage in the power carrier 110 or 210.

Each power carrier connector 314 includes any suitable connector that facilitates docking with and power transfer to or from one or more power carriers. For example, a power carrier connector 314 could include one or more magnetic or electromagnetic structures that are used to physically attract or repel a corresponding connector on a power carrier 110 or 210, which can help to couple the power carrier to or decouple the power carrier from the vehicle 300. The power carrier connector 314 could also include one or more power transfer mechanisms used to transfer power to or from a power carrier 110 or 210. Specific examples of power transfer mechanisms can include fixed or movable electrodes or electrical contacts used for direct electrical power transfer or conductive windings used for inductive power transfer. Each power storage 316 denotes any suitable structure(s) for storing electrical power, such as one or more batteries or super-capacitors. Each power generator 318 includes any suitable structure configured to generate electrical energy, such as by generating electrical energy based on one or more flows of a liquid and/or vapor refrigerant (like refrigerant flows created using pressure and/or temperature differences in tanks holding the refrigerant).

The power generated or received by the vehicle 300 can be supplied to any of the components in FIG. 3. For example, electrical power could be provided to the controller 302 and memory 304 to facilitate computations and instruction execution by the controller 302 and data storage/retrieval by the memory 304. Electrical power could also be provided to the sensor components 306, communication interfaces 308, and device actuators 310 in order to support sensing, communication, and actuation operations. Electrical power could further be provided to the propulsion components 312 in order to support movement of the vehicle 300. In addition, at least some power (either generated internally or received from a power carrier) could be stored in the power storage 316 to facilitate operation of the vehicle 300 during times when, for instance, one power carrier 110 or 210 is being replaced by another power carrier 110 or 210.

Although FIG. 3 illustrates one example of components of an underwater vehicle 300 for use with a power carrier, various changes may be made to FIG. 3. For example, various components in FIG. 3 could be combined, further subdivided, rearranged, or omitted or additional components could be added according to particular needs.

Figure 4:
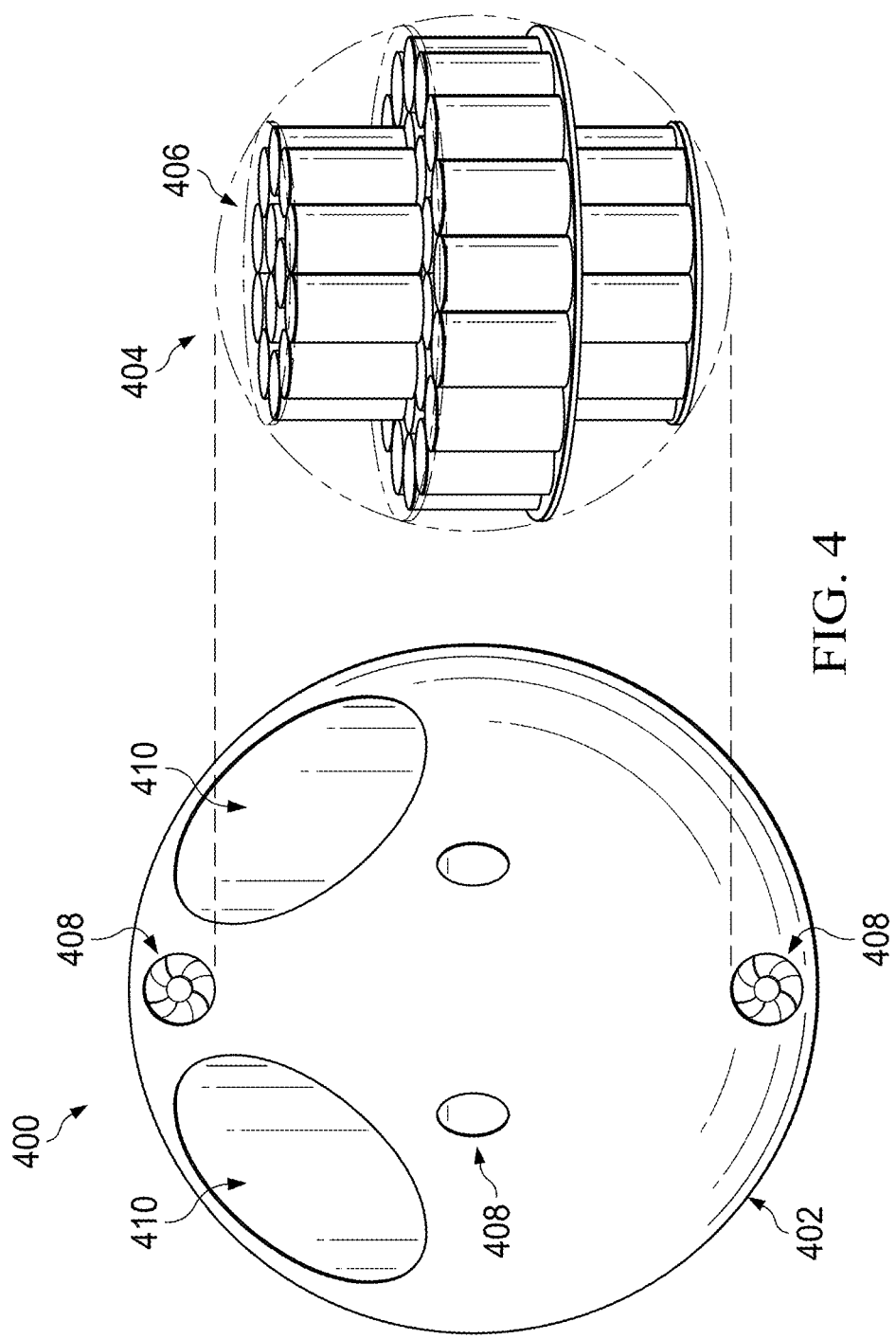
FIG. 4 illustrates a first example power carrier for underwater vehicles or other devices in accordance with this disclosure.

FIG. 4 illustrates a first example power carrier 400 for underwater vehicles or other devices in accordance with this disclosure. The power carrier 400 could, for example, denote either of the power carriers 110 and 210 and be used with any of the underwater vehicles 100, 200, 300 described above. However, the power carrier 400 could be used with any other suitable device or system.

As shown in FIG. 4, the power carrier 400 includes a shell or body 402. The body 402 denotes any suitable structure configured to encase, protect, or otherwise contain other components of the power carrier 400. The body 402 could be formed from any suitable material(s) and in any suitable manner, and the body 402 could be watertight to protect the other components of the power carrier 400. For instance, the body 402 could be formed by two hemispherical portions, one with a male connector and one with a female connector. A row of fasteners could be positioned along the circumference of the body 402 and used to couple the hemispherical portions together. A double O-ring seal could be formed by placing multiple O-rings on the male connector prior to coupling to the female connector. The body 402 can also be formed so that the power carrier 400 is able to withstand extremely elevated pressures found at deep depths in an ocean or other body of water. For example, the body 402 could include a pressure port used to pressurize the interior of the body 402 prior to use, which can help to reduce the pressure differential between the interior of the body 402 and external water pressure. The pressure port could also be used to support integrity testing of the power carrier 400 prior to use. In some embodiments, the body 402 could allow the power carrier 400 to operate at depths of up to 1,000 meters or more.

A core 404 is encased within the body 402. The core 404 denotes the portion of the power carrier 400 that is used to store power for underwater vehicles (and possibly for the power carrier 400 itself). The core 404 includes any suitable structure containing one or more rechargeable power supplies. In this example, the core 404 includes a collection of rechargeable batteries 406 arranged in multiple layers, although the core 404 could include any number of batteries 406 placed in any suitable configuration. As a specific example, the core 404 could include three layers of rechargeable D-cell batteries, with the middle layer containing twenty rechargeable D-cell batteries and the upper and lower layers containing eleven rechargeable D-cell batteries. The specific arrangement used with the batteries 406 or other power supplies could be selected based on the desired center of gravity for the core 404 or the power carrier 400. In particular embodiments, the body 402 could be about one foot in diameter, and the core 404 could be about eight inches in diameter.

In some embodiments, the body 402 and/or the core 404 could contain gas (such as atmospheric air or other type of gas) that is maintained within the power carrier 400 during use. The gas may help to compensate for the weight of the batteries 406 or other power supplies and create a substantially neutral buoyance for the power carrier 400. For example, forty-two D-cell batteries 406 could weight approximately fourteen pounds, and the body 402 or core 404 could contain approximately one-half gallon of air.

The body 402 includes various ducts 408, which denote passages through portions of the body 402. Motors, thrusters, or other mechanisms (referred to collectively as "drivers") disposed within the ducts 408 can cause water to flow through the ducts 408 in order to maneuver the power carrier 400. The body 402 could include any suitable number of ducts 408 supporting movement of the power carrier 400 in any suitable directions. In particular embodiments, the ducts 408 support up to six degrees of freedom in the movement of the power carrier 400, such as when the power carrier 400 can move forward, backward, up, down, left, and right. In this example, the ducts 408 denote channels formed completely in the body 402 itself, so the ducts 408 do not extend into the volume where the core 404 is located.

The power carrier 400 also includes one or more connectors 410. The connectors 410 denote interfaces where magnetic or other couplings can be used to temporarily connect the power carrier 400 to an underwater vehicle and to transfer power between the power carrier 400 and the underwater vehicle. For example, the power carrier connector 314 of an underwater vehicle 100, 200, 300 could include one or more magnetic or electromagnetic structures that are used to physically attract or repel one or more magnetic or electromagnetic structures in the connectors 410 of the power carrier 400. As a specific example, each connector 410 could denote an energizable magnetic "patch" that generates one or more electromagnetic fields.

FIGS. 5A through 5D illustrate example movements of the power carrier 400 for underwater vehicles or other devices in accordance with this disclosure. In some embodiments, there may be four ducts 408 (denoted 408a and 408b) defining four flow passages through the body 402. Two of the ducts 408a can be oriented horizontally in FIGS. 5A through 5D, and two of the ducts 408b can be oriented vertically in FIGS. 5A through 5D.

Figure 5A:
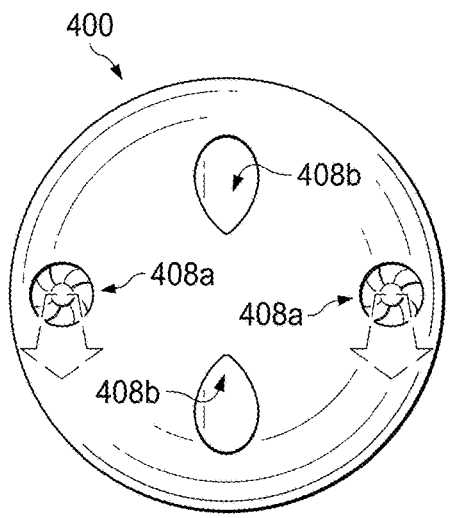
FIGS. 5A through 5D illustrate example movements of a power carrier for underwater vehicles or other devices in accordance with this disclosure.
Figure 5B:
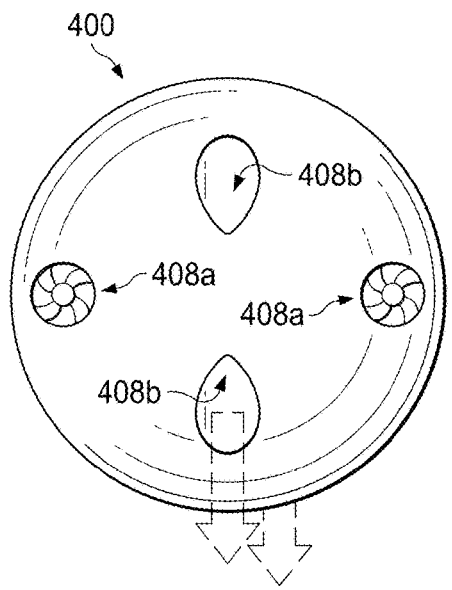

The four flow passages can be used to orient and maneuver the power carrier 400 in three dimensions. For example, as shown in FIG. 5A, water could be forced to flow through the two horizontal ducts 408a in the same direction to move the power carrier 400 forward. Reversing the flows in FIG. 5A through the two horizontal ducts 408a would move the power carrier 400 backward. Similarly, as shown in FIG. 5B, water could be forced to flow through the two vertical ducts 408b in the same direction to move the power carrier 400 up. Reversing the flows through the two vertical ducts 408b would move the power carrier 400 down.

Figure 5C:
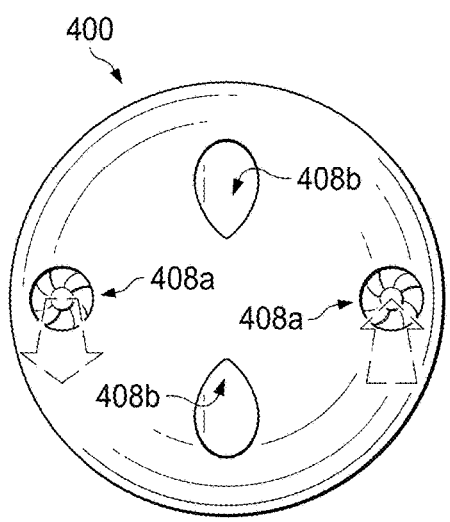
Figure 5D:
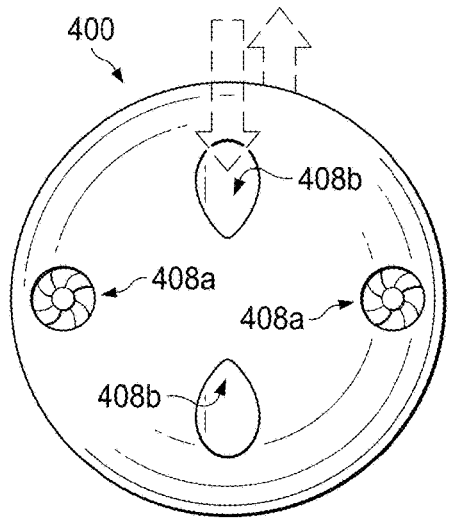

As shown in FIG. 5C, water could be forced to flow through the two horizontal ducts 408a in opposite directions to provide yawing movement and rotate the power carrier 400 to the right. Reversing the flows in FIG. 5C through the two horizontal ducts 408a would rotate the power carrier 400 to the left. Similarly, as shown in FIG. 5D, water could be forced to flow through the two vertical ducts 408b in opposite directions to provide pitch movement and rotate the power carrier 400 through a horizontal axis in one direction. Reversing the flows in FIG. 5D through the two vertical ducts 408b would rotate the power carrier 400 through the horizontal axis in the opposite direction.

In this way, the ducts 408 through the body 402 could be used to support different movements of the power carrier 400. While only four ducts 408a and 408b are used here, these four ducts can be used to support movement in three dimensions. For example, the movements of the power carrier 400 in FIG. 5A could be along an X axis, and the movements of the power carrier 400 in FIG. 5B could be along a Z axis. Rotation of the power carrier 400 in FIG. 5C could orient the power carrier 400 so that forward and backward movement moves the power carrier 400 along a Y axis. Of course, the body 402 could include six ducts 408, two ducts extending in each of the X, Y, and Z dimensions, to support direct movement in three dimensions.

Note that while terms like "horizontal" and "vertical" are used here to describe the motions of the power carrier 400 and the directions of the ducts 408a-408b, this is only done with reference to the specific orientation shown in FIGS. 5A through 5D. During use, the power carrier 400 need not retain this orientation, and the various ducts 408 of the power carrier 400 can be used to support any suitable motion within a three-dimensional space regardless of the power carrier's orientation.

Figure 6:
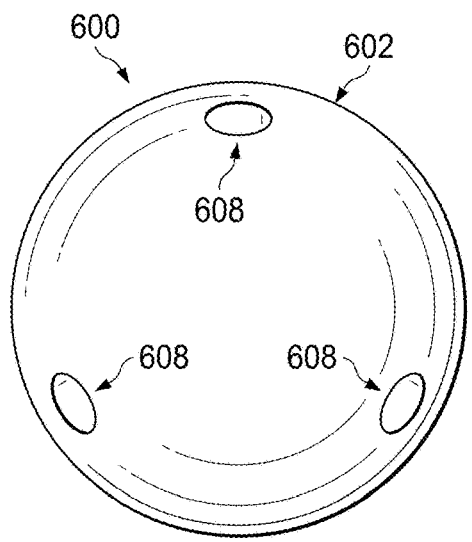
FIG. 6 illustrates a second example power carrier for underwater vehicles or other devices in accordance with this disclosure.

Other arrangements of flow passages through a power carrier body could also be used. For instance, FIG. 6 illustrates a second example power carrier 600 for underwater vehicles or other devices in accordance with this disclosure. In this example, the power carrier 600 includes a body 602 with three ducts 608, which could be arranged in substantially orthogonal directions. In some embodiments, the three ducts 608 could pass through a center of gravity of the power carrier 600, although this need not be the case. In FIG. 6, the ducts 608 could extend into the interior of the body 602, so a core of the power carrier 600 could be reshaped to permit passage of the ducts 608. Motors, thrusters, or other drivers can cause water to flow through the ducts 608 in order to maneuver the power carrier 600.

Figure 7A:
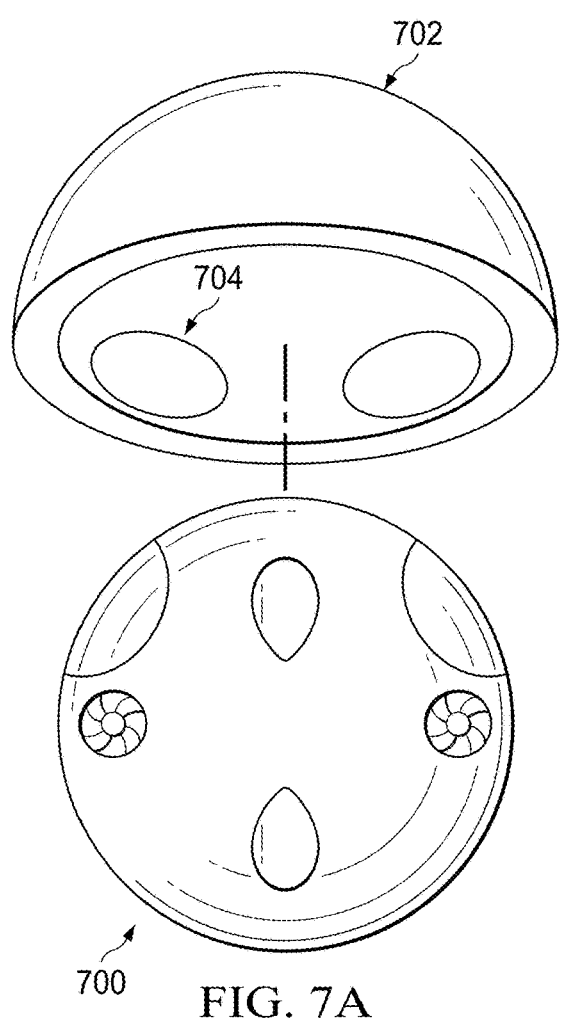
FIGS. 7A and 7B illustrate example connectors of a power carrier and an underwater vehicle in accordance with this disclosure.
Figure 7B:
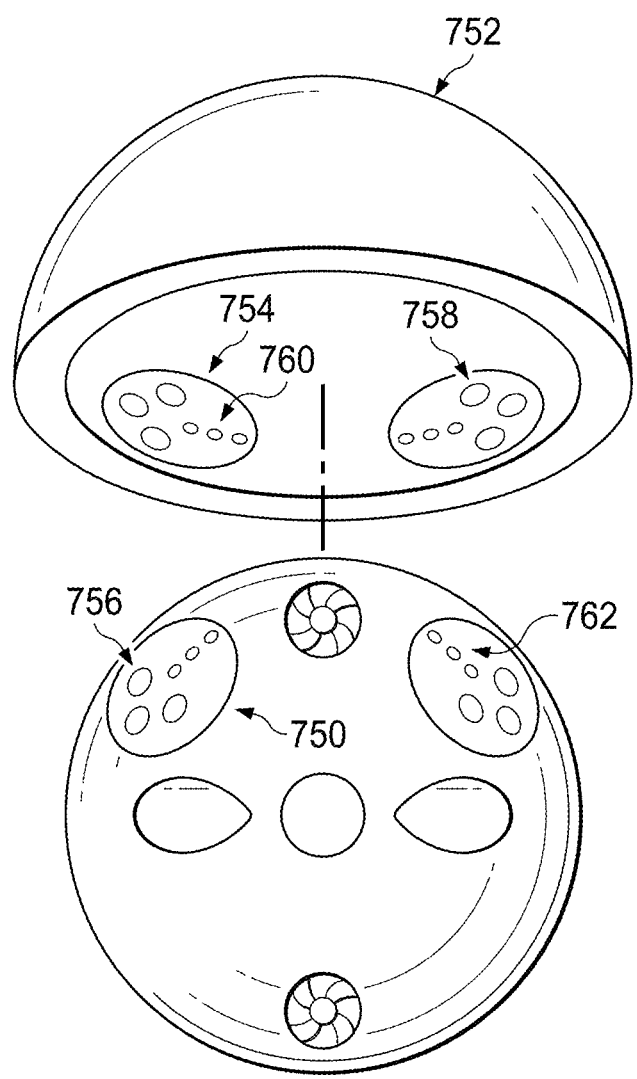

FIGS. 7A and 7B illustrate example connectors of a power carrier and an underwater vehicle in accordance with this disclosure. These connectors could be used for each of the connectors 410 in FIG. 4. In FIG. 7A, a power carrier includes various connectors 700, and a docking structure 702 of an underwater vehicle includes various complementary connectors 704. The power carrier and the docking structure 702 are designed to function as a "ball and socket" type dock. The connectors 700 of the power carrier are positioned to align with the connectors 704 of the docking structure 702. There could be any suitable number of connectors 700 on the power carrier and any suitable number of connectors 704 on the docking structure 702, such as four connectors 700 and four connectors 704. Each of the connectors 700 and 704 could be designed to generate at least one magnetic field, and the magnetic fields of at least one of the connectors 700 and 704 could be selectively generated or reversed to provide desired attraction or repulsion action. For instance, the connectors 700 and 704 could include coils that can be selectively energized or switchable magnets.

In FIG. 7B, a power carrier includes various connectors 750, and a docking structure 752 of an underwater vehicle includes various complementary connectors 754. Again, the power carrier and the docking structure 752 are designed to function as a "ball and socket" type dock. The connectors 750 of the power carrier are positioned to align with the connectors 754 of the docking structure 752. There could be any suitable number of connectors 750 on the power carrier and any suitable number of connectors 754 on the docking structure 752, such as four connectors 750 and four connectors 754. Each of the connectors 750 and 754 could be designed to generate at least one magnetic field, and the magnetic fields of at least one of the connectors 750 and 754 could be selectively generated or reversed to provide desired attraction or repulsion action. For instance, the connectors 750 and 754 could include permanent magnetic patches. In addition, each of the connectors 750 includes magnetic bumps 756 that can align with recesses 758 in the connectors 754, and each of the connectors 754 includes stringer electrodes 760 that can couple to electrodes 762 in the connectors 750. The magnetic bumps 756 and recesses 758 can provide fine alignment of the power carrier with the docking structure 752, and the electrodes 760 and 762 can provide In some embodiments, the power carrier connector 314 of an underwater vehicle (such as the vehicle 300) can generate magnetic fields that align with (and are opposite to) the magnetic fields generated by the connector(s) 410, 700, 750.

When the power carrier 400 approaches the vehicle 300, this causes the power carrier 400 to be magnetically attracted to the underwater vehicle 300 while orienting the power carrier 400 for use with the underwater vehicle. If desired, the magnetic fields of one or both devices could later be turned off, or one of the magnetic fields could be reversed so that the power carrier 400 is pushed away from the underwater vehicle. In particular embodiments, at least one of the power carrier and the underwater vehicle could use switchable magnets to generate the desired magnetic fields, although any other suitable structures could be used to generate the desired magnetic fields.

Although FIGS. 4 through 7 illustrate examples of power carriers for underwater vehicles or other devices and related details, various changes may be made to FIGS. 4 through 7. For example, while not shown, the core 406, the batteries 406 or other power supplies, and one or more connectors 410 could be used with the power carrier 600. Also, the size, shape, and relative dimensions of the power carriers and their components are for illustration only, and other sizes, shapes, and relative dimensions could be used. As a particular example, a power carrier need not be spherical and could have other shapes, such as cylindrical. In addition, as noted above, there could be any suitable number of flow passages for motors, thrusters, or other drivers in a power carrier, and those flow passages can be placed in any suitable configuration.

Figure 8:
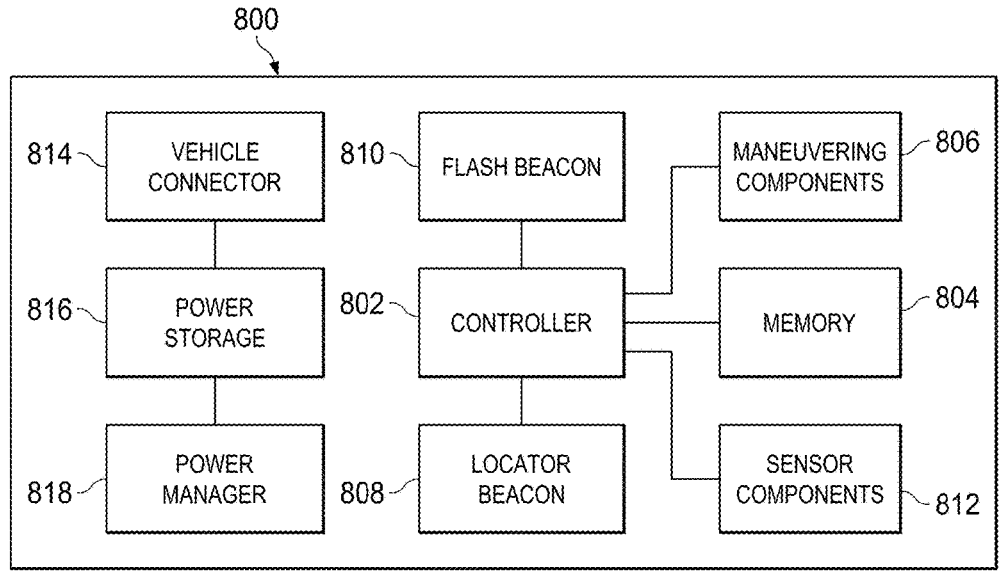
FIG. 8 illustrates example components of a power carrier for underwater vehicles or other devices in accordance with this disclosure.

FIG. 8 illustrates example components of a power carrier 800 for underwater vehicles or other devices in accordance with this disclosure. The power carrier 800 could, for example, denote any of the power carriers 110, 210, 400, 600 described above. The components shown in FIG. 8 could therefore denote internal or other components of any of the power carriers 110, 210, 400, 600.

As shown in FIG. 8, the power carrier 800 includes at least one controller 802 and at least one memory 804. The controller 802 controls the overall operation of the power carrier 800, such as by controlling the charging or discharging of the power carrier 800 and by identifying a nearby underwater vehicle and maneuvering towards it. The controller 802 can denote any suitable hardware or combination of hardware and software/firmware for controlling the power carrier 800. For example, the controller 802 could denote at least one processor configured to execute instructions obtained from the memory 804. The controller 802 may include any suitable number(s) and type(s) of processors or other computing or control devices in any suitable arrangement. Example types of controllers 802 include microprocessors, microcontrollers, digital signal processors, field programmable gate arrays, application specific integrated circuits, and discrete circuitry.

The memory 804 stores data used, generated, or collected by the controller 802 or other components of the power carrier 800. Each memory 804 represents any suitable structure(s) configured to store and facilitate retrieval of information (such as data, program code, and/or other suitable information on a temporary or permanent basis). Some examples of the memory 804 can include at least one random access memory, read only memory, Flash memory, or any other suitable volatile or non-volatile storage and retrieval device(s).

The power carrier 800 in this example also includes one or more maneuvering components 806, which denote components used to physically move the power carrier 800 through water. The maneuvering components 806 could denote multiple motors, thrusters, or other drivers and can be used in conjunction with the ducts 408, 608 described above.

In particular embodiments, the maneuvering components 806 could include 50 mm, 70 mm, or 100 mm thrusters, such as INTEGRATEDTHRUSTER devices from TSL TECHNOLOGY LTD.

The power carrier 800 in this example further includes one or more locator beacons 808, one or more flash beacons 810, and one or more sensor components 812. Each locator beacon 808 includes a signal generator configured to generate some type of signal that can be used to locate or identify the power carrier 800 itself or an underwater vehicle. For example, the locator beacons 808 could generate low-frequency radio waves or other signals that can be detected by underwater vehicles. Each flash beacon 810 includes an optical signal generator configured to generate some type of optical signal that can be used to visually locate or identify the power carrier 800. For instance, the flash beacons 810 could include light emitting diode (LED) or other lamps that can flash or generate other optical illumination. The sensor components 812 can be used to sense various conditions around the power carrier 800, such as the presence of a nearby underwater vehicle. The sensor components 812 could then provide data to the controller 802, allowing the controller 802 to maneuver the power carrier 800 towards to the underwater vehicle and into a suitable docking position (via the maneuvering components 806).

In addition, the power carrier 800 includes at least one vehicle connector 814, at least one power storage 816, and at least one power manager 818. Each vehicle connector 814 generally allows the power carrier 800 to be coupled to an underwater vehicle in order to receive power from or provide power to the underwater vehicle. The vehicle connectors 814 could, for example, denote the connectors 410 shown in FIG. 4 or the connector 700 shown in FIG. 7. Each power storage 816 is used to store power for some underwater vehicles and could optionally be charged by other underwater vehicles. Each power storage 816 denotes any suitable structure(s) for storing electrical power, such as one or more batteries or super-capacitors. For instance, the power storage 816 could denote the rechargeable batteries 406 or other power supplies within the core 404 of a power carrier.

The power manager 818 controls the charging and discharging of the power storage 816. For example, the power manager 818 could monitor the charges stored on different batteries or other components of the power storage 816 and control the rates at which the batteries or other components of the power storage 816 are charged and discharged. The power manager 818 could also perform active balancing or other operations to help balance or equalize the power stored on different batteries or other components of the power storage 816. The power manager 818 includes any suitable structure for controlling the charging and discharging of power supplies.

In some embodiments, a number of the components in FIG. 8 could reside within the shell or body 402 of a power carrier. For example, in some embodiments, the power storage 816 could reside within the core 404 of the power carrier, and any other components 802-814, 818 of the power carrier could reside within the shell or body 402 of the power carrier.

Although FIG. 8 illustrates one example of components of a power carrier 800 for underwater vehicles or other devices, various changes may be made to FIG. 8. For example, various components in FIG. 8 could be combined, further subdivided, rearranged, or omitted or additional components could be added according to particular needs.

Figure 9:
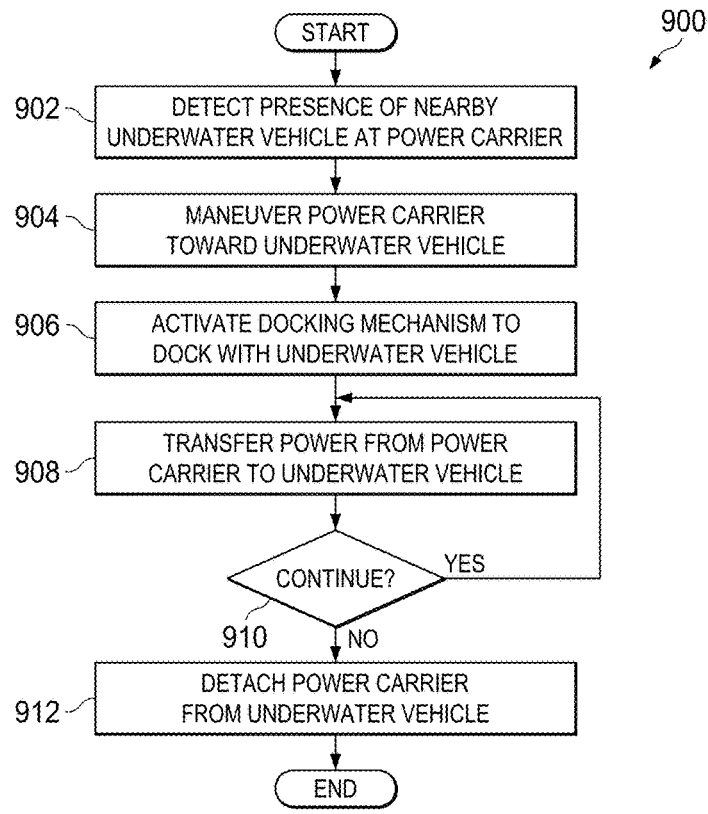
FIGS. 9 and 10 illustrate example methods of using a power carrier for underwater vehicles or other devices in accordance with this disclosure.
Figure 10:
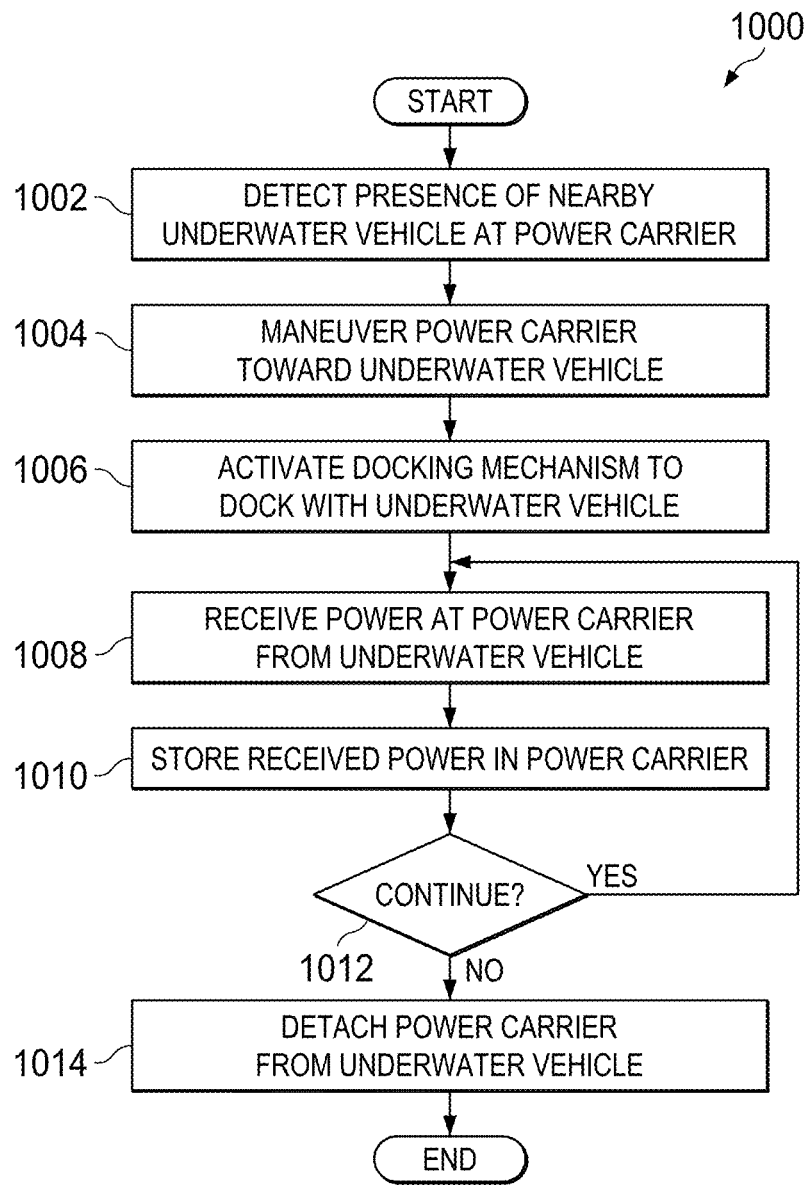

FIGS. 9 and 10 illustrate example methods of using a power carrier for underwater vehicles or other devices in accordance with this disclosure. In particular, FIG. 9 illustrates an example method 900 for providing power from a power carrier for use by a first underwater vehicle, and FIG. 10 illustrates an example method 1000 for charging a power carrier by a second underwater vehicle.

As shown in FIG. 9, the presence of a nearby underwater vehicle is detected at a power carrier at step 902. This could include, for example, the controller 802 of the power carrier 110, 210, 400, 600, 800 receiving sensor data from the one or more sensor components 812. The sensor data could indicate that signals from an underwater vehicle 100, 200, 300 have been detected or that the underwater vehicle 100, 200, 300 has been sensed in some other manner. The power carrier is maneuvered toward the underwater vehicle at step 904. This could include, for example, the controller 802 controlling the maneuvering components 806 of the power carrier 110, 210, 400, 600, 800 so that the power carrier 110, 210, 400, 600, 800 moves toward the detected underwater vehicle. In some embodiments, only the power carrier may be maneuvered, since maneuvering the power carrier could be simpler or easier than maneuvering the underwater vehicle. Of course, the underwater vehicle could also or alternatively be maneuvered toward the power carrier.

Once the power carrier is in a suitable docking position (such as near an end or other portion of the underwater vehicle), a docking mechanism of the power carrier is activated to dock the power carrier with the underwater vehicle at step 906. This could include, for example, the controller 802 activating a connector 410, 700, 750, 814 of the power carrier 110, 210, 400, 600, 800 so that the connector generates one or more local magnetic fields attracted to one or more local magnetic fields generated by the connector 314 of the underwater vehicle 100, 200, 300. Note, however, that any other suitable magnetic or non-magnetic docking mechanisms could be used to link the power carrier and the underwater vehicle.

Once docked, power is transferred from the power carrier to the underwater vehicle at step 908. This could include, for example, the controller 802 causing power to flow from the batteries 406 or other components of the power storage 816 to the underwater vehicle 100, 200, 300. The power could flow through electrodes, electrical contacts, or other physical components of the connectors 410, 700, 750, 814. The power could also be transferred to the underwater vehicle 100, 200, 300 inductively through the connectors 410, 700, 750, 814 of the power carrier 110, 210, 400, 600, 800 or in any other suitable manner.

The power transfer can continue for any suitable length of time, such as during a prolonged period of operation of the underwater vehicle 100, 200, 300. At some point, a decision is made to no longer supply power to the underwater vehicle 100, 200, 300 at step 910. This could occur, for example, when the power stored in the power storage 816 drops below a desired level or the underwater vehicle 100, 200, 300 reaches a location where the power carrier 110, 210, 400, 600, 800 will be replaced. In response, the power carrier is detached from the underwater vehicle at step 912. At this point, the power carrier could perform any desired actions, such as surfacing and waiting for retrieval or waiting for another underwater vehicle to come charge the power carrier.

As shown in FIG. 10, the presence of a nearby underwater vehicle is detected at a power carrier at step 1002. This could include, for example, the controller 802 of the power carrier 110, 210, 400, 600, 800 receiving sensor data from the one or more sensor components 812. The sensor data could indicate that signals from an underwater vehicle 100, 200, 300 have been detected or that the underwater vehicle 100, 200, 300 has been sensed in some other manner. The power carrier is maneuvered toward the underwater vehicle at step 1004. This could include, for example, the controller 802 controlling the maneuvering components 806 of the power carrier 110, 210, 400, 600, 800 so that the power carrier 110, 210, 400, 600, 800 moves toward the detected underwater vehicle 100, 200, 300. In some embodiments, only the power carrier may be maneuvered, since maneuvering the power carrier could be simpler or easier than maneuvering the underwater vehicle. Of course, the underwater vehicle could also or alternatively be maneuvered toward the power carrier.

Once the power carrier is in a suitable docking position (such as near an end or other portion of the underwater vehicle), a docking mechanism of the power carrier is activated to dock the power carrier with the underwater vehicle at step 1006. This could include, for example, the controller 802 activating a connector 410, 700, 750, 814 of the power carrier 110, 210, 400, 600, 800 so that the connector 410, 700, 750, 814 generates one or more local magnetic fields attracted to one or more local magnetic fields generated by the connector 314 of the underwater vehicle 100, 200, 300. Note, however, that any other suitable magnetic or non-magnetic docking mechanisms could be used to link the power carrier and the underwater vehicle.

Once docked, power is received from the underwater vehicle at the power carrier at step 1008 and stored in the power carrier at step 1010. This could include, for example, power flowing through the connectors 410, 700, 750, 814 into the power storage 816. The power could flow through electrodes, electrical contacts, or other physical components of the connectors 410, 700, 750, 814. The power could also be received from the underwater vehicle 100, 200, 300 inductively through the connectors 410, 700, 750, 814 of the power carrier 110, 210, 400, 600, 800 or in any other suitable manner. The power could be generated by the underwater vehicle in any suitable manner, such as by generating electrical energy based on one or more flows of a liquid and/or vapor refrigerant (like refrigerant flows created using pressure and/or temperature differences in tanks holding the refrigerant).

The power transfer can continue for any suitable length of time, such as until the amount of stored power in the power storage 816 reaches a threshold level. At some point, a decision is made to no longer receive power from the underwater vehicle at step 1012. In response, the power carrier is detached from the underwater vehicle at step 1014. At this point, the power carrier could perform any desired actions, such as waiting for the approach of an underwater vehicle to be powered by the charged power carrier.

Although FIGS. 9 and 10 illustrate examples of methods of using a power carrier for underwater vehicles or other devices, various changes may be made to FIGS. 9 and 10. For example, while shown as a series of steps, various steps in each figure could overlap, occur in parallel, occur in a different order, or occur any number of times.

FIGS. 11 through 13B illustrate example power generation systems 1100, 1200, 1300 for use in underwater vehicles that charge power carriers in accordance with this disclosure. The power generation systems 1100, 1200, 1300 could, for example, be used as the power generator 318 in any of the underwater vehicles 100, 200, 300 to generate power for charging any of the power carriers 110, 210, 400, 600 described above. However, the power generation systems 1100, 1200, 1300 could be used with any other suitable device or system.

Figure 11:
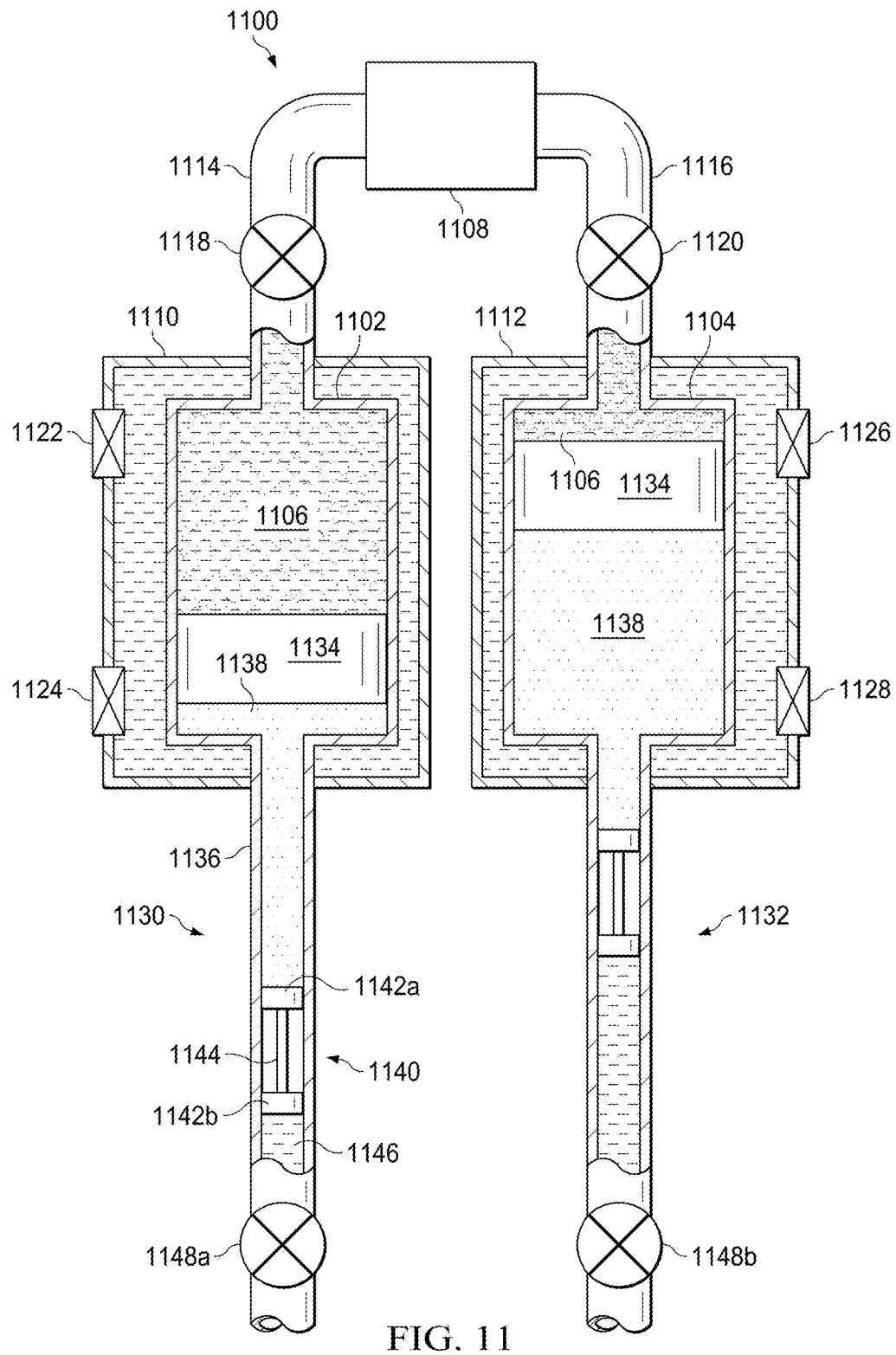
FIGS. 11 through 13B illustrate example power generation systems for use in underwater vehicles that charge power carriers in accordance with this disclosure.

As shown in FIG. 11, the system 1100 generally employs a Carnot-Brayton cycle involving two tanks 1102 and 1104. A refrigerant 1106 is transferred back and forth between the tanks 1102 and 1104 through a generator 1108. Each tank 1102 or 1104 is configured to hold the refrigerant 1106 under pressure and to provide the refrigerant 1106 through the generator 1108 to the other tank 1104 or 1102. When the refrigerant 1106 passes through the generator 1108, the generator 1108 generates electrical power.

The system 1100 can also include multiple insulated water jackets 1110 and 1112. Each insulated water jacket 1110 and 1112 receives and retains warmer or colder water in order to facilitate movement of the refrigerant 1106 between the tanks 1102 and 1104. For example, the tank 1102 or 1104 containing more refrigerant 1106 can be surrounded by warmer water, increasing the pressure in that tank. Conversely, the tank 1104 or 1102 containing less refrigerant 1106 can be surrounded by colder water, lowering the pressure in that tank. The pressure difference can be used to facilitate easier or more effective refrigerant transport between the tanks 1102 and 1104.

Conduits 1114 and 1116 respectively couple the tanks 1102 and 1104 to the generator 1108. Valves 1118 and 1120 are used to control the flow of the refrigerant 1106 through the conduits 1114 and 1116. Additional valves 1122-1128 are included in the insulated water jackets 1110 and 1112 to control the flow of warmer or colder water into and out of the insulated water jackets 1110 and 1112. Although not shown, pumps or other mechanisms can be used to help pull water into or push water out of the insulated water jackets 1110 and 1112.

Each tank 1102 and 1104 is associated with a hydraulic drive 1130 and 1132, respectively. Each hydraulic drive 1130 and 1132 is configured to use water pressure when a vehicle dives underwater to help force the refrigerant 1106 out of one of the tanks 1102 and 1104. In this example, each hydraulic drive 1130 or 1132 includes a piston 1134 within the associated tank 1102 or 1104. Each hydraulic drive 1130 or 1132 also includes a channel 1136 that contains a hydraulic fluid 1138 and a movable piston structure 1140. The channel 1136 is fluidly coupled to the associated tank 1102 or 1104 so that the hydraulic fluid 1138 can move freely into and out of the tank. The amount of hydraulic fluid 1138 forced into the associated tank 1102 or 1104 controls the position of the piston 1134 in that tank, thereby controlling the amount of force being applied to the refrigerant 1106 in that tank.

The movable piston structure 1140 represents a structure that moves based on external pressure in order to increase or decrease the amount of hydraulic fluid 1138 within the associated tank 1102 or 1104. In this example, the movable piston structure 1140 includes two small pistons 1142a-1142b attached by a connecting bar 1144, although any other suitable piston(s) could be used as the piston structure 1140. The piston structure 1140 is moved using water 1146, which is allowed to enter the hydraulic drive 1130 or 1132 via a respective valve 1148a or 1148b.

During operation, assume the system is in a vehicle that is currently underwater, most or all of the refrigerant 1106 is located in the tank 1102, and the valves 1118 and 1120 have been closed to prevent further transfer of refrigerant 1106. The valve 1148a is closed, the valve 1148b is opened, and there is more water 1146 in the hydraulic drive 1132 than in the hydraulic drive 1130. Once the vehicle ascends, the valve 1148*b* remains opened, and the water in the water jackets 1110 and 1112 can be flushed and replaced with warmer water. The higher ambient temperature and/or the higher temperature of the warmer water in the water jacket 1112 can heat the refrigerant 1106 in the tank 1104, causing the refrigerant 1106 to expand and push some of the water 1146 out of the hydraulic drive 1132 through the valve 1148*b*. The vehicle can then close the valve 1148*b* and dive to a desired depth. Once at a desired depth, the water in the water jacket 1112 can be flushed and replaced with colder water. Also, the valves 1118, 1120, and 1148*a* can be opened. The temperature differential between the tanks 1102 and 1104 (created in part by the temperature differential of the water in the water jackets 1110 and 1112) and the pressure created by the piston 1134 in the tank 1102 (caused by water pressure through the valve 1148*a*) causes most or all of the refrigerant 1106 to flow from the tank 1102 into the tank 1104 through the generator 1108, producing electrical power. Eventually, the system 1100 reaches a state where the bulk of the refrigerant 1106 has been transferred to the tank 1104 and the piston 1134 in the tank 1102 has reached its maximum travel. As this point, the same process can occur with the tanks reversed.

Figure 12:
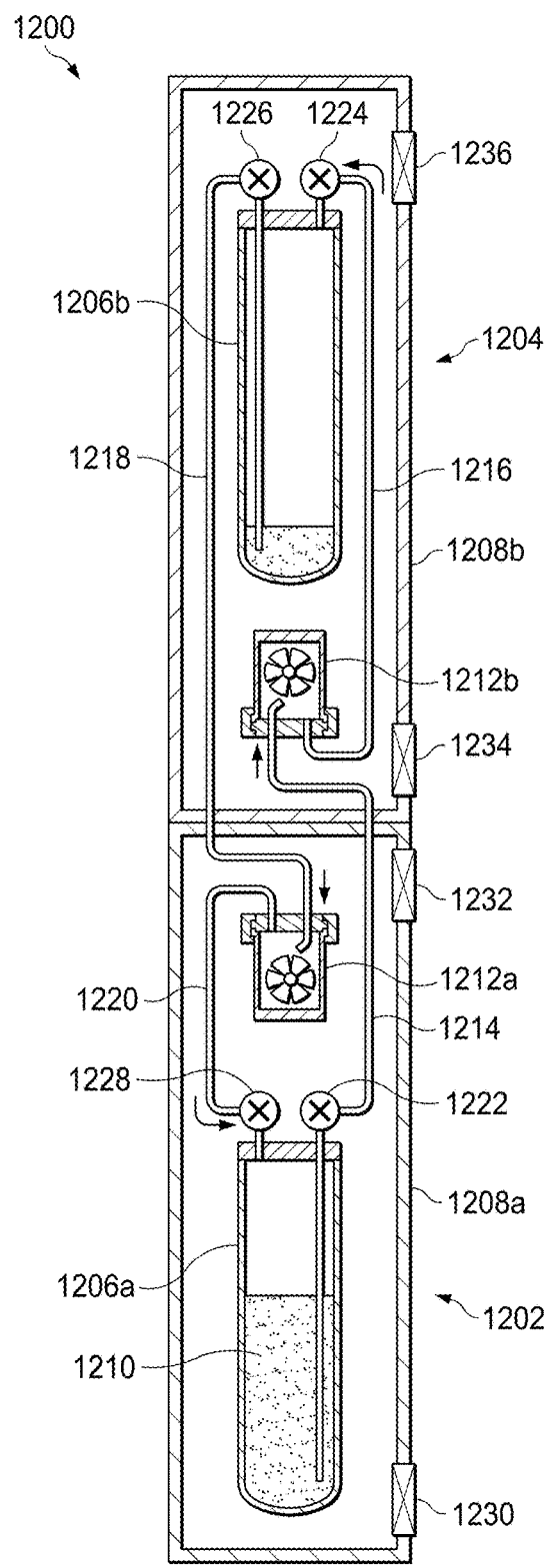

As shown in FIG. 12, the system 1200 includes multiple insulated tank structures 1202-1204, which are formed using tanks 1206*a*-1206*b* and insulated water jackets 1208*a*-1208*b*. Each tank 1206*a*-1206*b* is configured to hold a refrigerant 1210 under pressure and to provide the refrigerant 1210 through one of multiple generators 1212*a*-1212*b* to the other tank 1206*a*-1206*b*.

Conduits 1214-1220 provide passageways for the refrigerant 1210 to travel through the system 1200. Valves 1222-1228 are used to control the flow of the refrigerant 1210 through the conduits 1214-1220. Additional valves 1230-1236 are included in the insulated water jackets 1208*a*-1208*b* to control the flow of warmer or colder water into and out of the insulated water jackets 1208*a*-1208*b*.

When the insulated water jacket 1208*a* contains warmer water and the insulated water jacket 1208*b* contains colder water and the appropriate valves 1222 and 1224 are opened, the refrigerant 1210 flows from the tank 1206*a* through the generator 1212*b* into the tank 1206*b*. Once electrical generation is completed, the valves 1222 and 1224 are closed, and the water in the insulated water jackets 1208*a*-1208*b* is replaced. When the insulated water jacket 1208*a* contains colder water and the insulated water jacket 1208*b* contains warmer water and the appropriate valves 1226 and 1228 are opened, the refrigerant 1210 flows from the tank 1206*b* through the generator 1212*a* into the tank 1206*a*. Once electrical generation is completed, the valves 1226 and 1228 are closed, and the water in the insulated water jackets 1208*a*-1208*b* is replaced. The system 1200 can therefore generate electrical power as a vehicle moves up and down in a body of water and replaces the water in the water jackets 1208*a*-1208*b*.

Figure 13A:
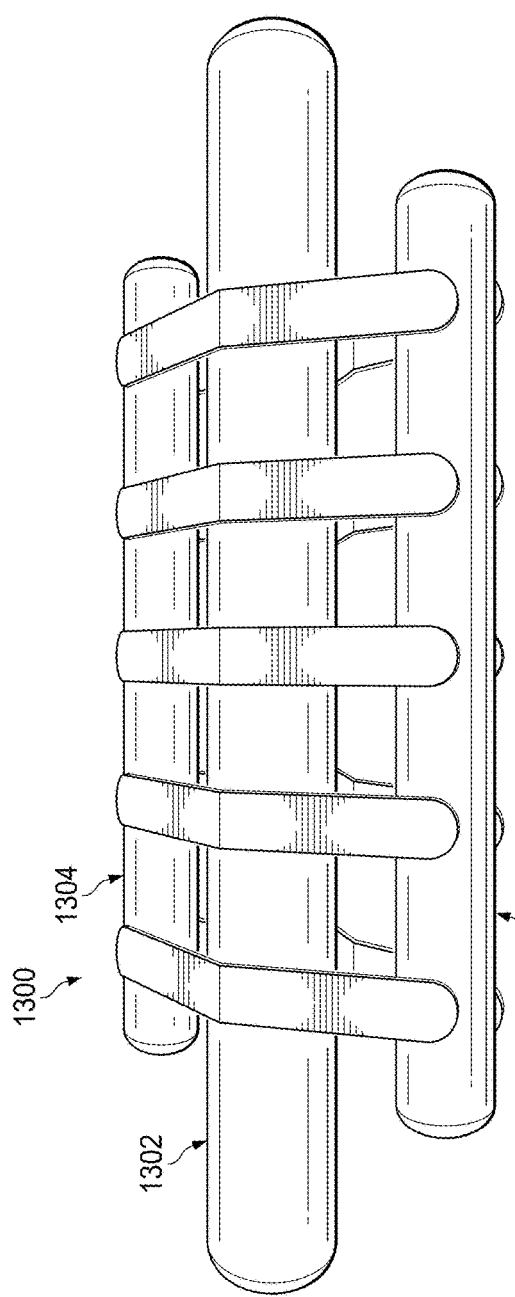
Figure 13B:
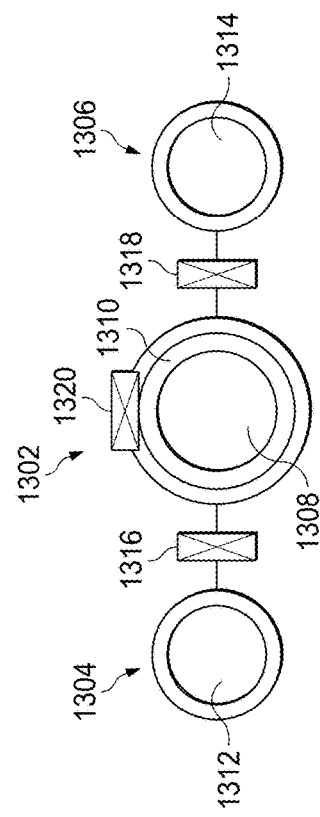

As shown in FIGS. 13A and 13B, the system 1300 includes a central insulated tank structure 1302 and two outer tank structures 1304-1306. The central insulated tank structure 1302 includes a tank 1308 with an insulated water jacket 1310. The outer tank structures 1304-1306 include tanks 1312-1314, respectively, which are not insulated or are insulated to a much smaller degree. Each tank 1308, 1312, 1314 is configured to hold a refrigerant under pressure. Valves 1316-1318 are used to control the flow of refrigerant between the central insulated tank structure 1302 and the outer tank structures 1304-1306. Valves 1320, possibly along with other components (such as one or more pumps), facilitate replacing the water within the insulated water jacket 1310.

Assume the bulk of a liquid refrigerant is located within the tanks 1312-1314, the water in the insulated water jacket 1310 is colder water (such as colder water obtained during an earlier cycle of the system 1300), and the system 1300 is located at or near the surface of a body of water. The liquid refrigerant in the tanks 1312-1314 absorb heat and can reach a significantly higher temperature than the colder water in the insulated water jacket 1310. This raises the pressure significantly within the tanks 1312-1314 while keeping the pressure within the tank 1308 at a lower pressure. Once the pressure within the tanks 1312-1314 is sufficiently high, the valves 1316-1318 are opened, and the refrigerant transfers into the tank 1308. The valves 1316 and 1318 are then closed to prevent the transfer of the refrigerant back into the tanks 1312-1314. At this point, the water in the insulated water jacket 1310 is flushed by opening the valves 1320 and replaced with warmer water, then the valves 1320 are closed and the warmer water increases the pressure within the tank 1308. Once the vessel dives to a desired depth, the warmer water within the insulated water jacket 1310 helps to maintain the refrigerant in the tank 1308 at a higher temperature and pressure, while the colder water in the ambient environment at the lower depths cools the tanks 1312-1314. The system 1300 then sends the refrigerant through a generator, and evaporated refrigerant is supplied to the tanks 1312-1314, where the colder temperatures of the tanks 1312-1314 condense the evaporated refrigerant back into liquid refrigerant. Once completed, the warmer water in the insulated water jacket 1310 is flushed and replaced with colder water. The system 1300 can then repeat the process by ascending to or near the surface of the body of water to repeat the process.

This represents a brief description of three example systems that use the flow of a liquid and/or vapor refrigerant to generate electrical power, where flows of the refrigerant are creating using pressure and/or temperature differences in tanks holding the refrigerant. Additional details of these example systems can be found in the U.S. patent applications incorporated by reference above.

Depending on the implementation, the power generation systems described above could be used to rapidly generate a large amount of power for one or multiple power carriers. For example, the power generation systems could generate energy at about a 100 Watt-hour (WHr) capacity using about five pounds of carbon dioxide refrigerant to about 1,000 WHr capacity using fifty pounds of carbon dioxide refrigerant. This could be accomplished using a dive cycle of around four hours, meaning five or six power carriers could be charged in a given twenty-four hour period.

Although FIGS. 11 through 13B illustrate examples of power generation systems for use in underwater vehicles that charge power carriers, various changes may be made to FIGS. 11 through 13B. For example, any other suitable system could be used to generate power for power carriers, and those systems may or may not rely upon one or more flows of refrigerant created using pressure/temperature differences.

Note that the various power carriers 110, 210, 400, 600, 800 are described above as being used with underwater vehicles, such as gliders and buoys like those shown in FIGS. 1A through 2C. However, the power carriers 110, 210, 400, 600, 800 described above could find use with a number of other devices or systems. For example, power carriers 110, 210, 400, 600, 800 could be used with stationary cameras, stationary sensors, or other devices or systems used partially or completely under water. Power carriers 110, 210, 400, 600, 800 could also be used with stationary power generators or other types of power generators used partially or completely under water that may not function as a vehicle. With appropriate scaling, power carriers 110, 210, 400, 600, 800 could be used with lower-power devices, such as toys or other objects used partially or completely under water. In this patent document, the phrase "host device" refers to any device or system that functions partially or entirely under water and that operates using or generates electric power. A host device could include In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. An apparatus comprising:
   a shell having multiple ducts that define multiple flow passages through the shell;
   a core disposed within the shell and comprising one or more rechargeable power supplies;
   multiple drivers configured to cause water to flow through the ducts in order to maneuver the apparatus toward a host device; and
   at least one interface on the shell, the at least one interface configured to receive power from the one or more rechargeable power supplies and provide the power to the host device.

2. The apparatus of claim 1, further comprising:
   a controller configured to control the drivers in order to maneuver the apparatus into a docking position with the host device.

3. The apparatus of claim 1, wherein the at least one interface is further configured to receive the power and to provide the power for storage in the one or more rechargeable power supplies.

4. The apparatus of claim 1, wherein the shell is spherical.

5. The apparatus of claim 4, wherein each of the ducts is formed completely in the shell and does not extend into an inner volume of the shell where the core is located.

6. The apparatus of claim 1, wherein the apparatus is configured to dock with the host device and to be transported by and supply the power to the host device as the host device travels through a body of water.

7. The apparatus of claim 1, further comprising at least one of:
   one or more beacons configured to generate signals in order to facilitate identification or location of the apparatus; and
   one or more sensors configured to detect the host device.

8. A method comprising:
   storing power in one or more rechargeable power supplies of a power carrier, the power carrier comprising (i) a shell having multiple ducts that define multiple flow passages through the shell and (ii) a core disposed within the shell and comprising the one or more rechargeable power supplies;
   maneuvering the power carrier toward a host device using multiple drivers that cause water to flow through the ducts; and
   transferring power from the one or more rechargeable power supplies to the host device using at least one interface on the shell of the power carrier.

9. The method of claim 8, further comprising:
   receiving the power for storage in the one or more rechargeable power supplies.

10. The method of claim 8, further comprising:
    generating one or more magnetic or electromagnetic fields using the at least one interface to dock the power carrier with the host device.

11. The method of claim 8, further comprising:
continuing to transfer the power from the one or more rechargeable power supplies to the host device as the power carrier is transported by the host device through a body of water.

12. The method of claim 8, further comprising:
sensing the host device;
wherein maneuvering the power carrier toward the host device occurs in response to the sensing of the host device.

13. A system comprising:
a host device; and
a power carrier comprising:
   a shell having multiple ducts that define multiple flow passages through the shell;
   a core disposed within the shell and comprising one or more rechargeable power supplies;
   multiple drivers configured to cause water to flow through the ducts in order to maneuver the power carrier toward the host device; and
   at least one interface on the shell, the at least one interface configured to receive power from the one or more rechargeable power supplies and provide the power to the host device.

14. The system of claim 13, wherein the host device comprises at least one second interface configured to dock with the at least one interface of the power carrier.

15. The system of claim 14, wherein at least one of the interfaces of the host device or the power carrier is configured to generate one or more magnetic or electromagnetic fields to dock the power carrier with the host device.

16. The system of claim 13, wherein the power carrier is configured to dock with the host device and to be transported by and supply the power to the host device as the host device travels through a body of water.

17. The system of claim 13, wherein the host device comprises a glider or a buoy.

18. A system comprising:
an underwater vehicle comprising a power generator; and
a power carrier comprising:
   a shell having multiple ducts that define multiple flow passages through the shell;
   a core disposed within the shell and comprising one or more rechargeable power supplies;
   multiple drivers configured to cause water to flow through the ducts in order to maneuver the power carrier toward the underwater vehicle; and
   at least one interface on the shell, the at least one interface configured to receive power from the underwater vehicle and provide the power for storage in the one or more rechargeable power supplies.

19. The system of claim 18, wherein the at least one interface of the power carrier is further configured to receive the power from the one or more rechargeable power supplies and to provide the power to a second underwater vehicle.

20. The system of claim 19, wherein the power carrier is configured to dock with the second underwater vehicle and to be transported by and supply the power to the second underwater vehicle as the second underwater vehicle travels through a body of water.

21. The system of claim 18, wherein the power generator is configured to generate electrical power based on a refrigerant flow that is created using different pressures or different temperatures in multiple tanks holding a refrigerant.

\* \* \* \* \*